US012450565B2

(12) United States Patent
Yang

(10) Patent No.: US 12,450,565 B2
(45) Date of Patent: Oct. 21, 2025

(54) ORDER REVIEW METHOD, DEVICE AND SYSTEM, AND RACK

(71) Applicant: BEIJING JINGDONG ZHENSHI INFORMATION TECHNOLOGY CO., LTD., Beijing (CN)

(72) Inventor: Wenxiang Yang, Beijing (CN)

(73) Assignee: BEIJING JINGDONG ZHENSHI INFORMATION TECHNOLOGY CO., LTD., Beijing (CN)

(*) Notice: Subject to any disclaimer, the term of this patent is extended or adjusted under 35 U.S.C. 154(b) by 316 days.

(21) Appl. No.: 18/000,783

(22) PCT Filed: Jun. 2, 2021

(86) PCT No.: PCT/CN2021/097869
§ 371 (c)(1),
(2) Date: Dec. 5, 2022

(87) PCT Pub. No.: WO2021/249253
PCT Pub. Date: Dec. 16, 2021

(65) Prior Publication Data
US 2023/0214775 A1 Jul. 6, 2023

(30) Foreign Application Priority Data
Jun. 8, 2020 (CN) .......................... 202010512870.2

(51) Int. Cl.
G06Q 10/00 (2023.01)
G06Q 10/0875 (2023.01)
(52) U.S. Cl.
CPC .............................. G06Q 10/0875 (2013.01)

(58) Field of Classification Search
CPC .................................................. G06Q 10/0875
See application file for complete search history.

(56) References Cited

U.S. PATENT DOCUMENTS

2002/0169628 A1  11/2002 Bauer
2017/0270754 A1  9/2017 Ning et al.
(Continued)

FOREIGN PATENT DOCUMENTS

CN    104550038 A    4/2015
CN    105631638 A    6/2016
(Continued)

OTHER PUBLICATIONS

"First Office Action and English language translation", CN Application No. 202010512870.2, Jun. 28, 2021, 16 pp.
(Continued)

Primary Examiner — Rokib Masud
(74) Attorney, Agent, or Firm — Myers Bigel, P.A.

(57) ABSTRACT

This disclosure discloses an order reviewing method, device and system and a rack, and relates to the field of warehousing. The method includes determining an order number of an order to which a commodity belongs; prompting a location on a rack corresponding to the commodity according to a correspondence between an order number and a location number of a location; in response to the commodity being placed on the location, determining whether the order has been reviewed; and if the order has been reviewed, sending a flipping instruction to a flipping system corresponding to the order according to a correspondence between an order and a device number of a flipping system, wherein a flip assembly of each flipping system corresponds to one location and is configured to close an inlet of the one location.

20 Claims, 14 Drawing Sheets

(56) References Cited

U.S. PATENT DOCUMENTS

| | | | | |
|---|---|---|---|---|
| 2018/0085788 | A1* | 3/2018 | Engel | B07C 1/025 |
| 2019/0127099 | A1* | 5/2019 | Langen | B65G 57/22 |
| 2020/0002094 | A1 | 1/2020 | Schedlbauer et al. | |
| 2021/0366223 | A1 | 11/2021 | Zhang et al. | |

FOREIGN PATENT DOCUMENTS

| | | |
|---|---|---|
| CN | 107618804 A | 1/2018 |
| CN | 107958358 A | 4/2018 |
| CN | 108190337 A | 6/2018 |
| CN | 108584268 A | 9/2018 |
| CN | 109607029 A | 4/2019 |
| CN | 109993899 A | 7/2019 |
| CN | 209222660 U | 8/2019 |
| CN | 209684570 U | 11/2019 |
| CN | 210682002 U | 6/2020 |
| CN | 111652560 A | 9/2020 |
| JP | H05270615 A | 10/1993 |
| JP | 2012218919 A | 11/2012 |
| JP | 2014162609 A | 9/2014 |
| JP | 2015051825 A | 3/2015 |
| JP | 2015078047 A | 4/2015 |
| KR | 20110080994 A | 7/2011 |
| KR | 101706079 B1 | 2/2017 |
| KR | 20170045796 A | 4/2017 |
| WO | 2019011276 A1 | 1/2019 |

OTHER PUBLICATIONS

"International Search Report and English language translation", International Application No. PCT/CN2021/097869, Aug. 27, 2021, 6 pp.

"Second Office Action and English language translation", CN Application No. 202010512870.2, Oct. 18, 2021.

"Communication with Supplementary European Search Report", EP Application No. 21821270.2, Apr. 23, 2024, 10 pp.

"Notice of Reasons for Refusal and English language transmittal", JP Application No. 2022-575439, Jul. 7, 2025, 10 pp.

"Request for the Submission of an Opinion with English language translation", KR Application No. 10-2023-7000432, Apr. 18, 2025, 16 pp.

* cited by examiner

ORDER REVIEW METHOD, DEVICE AND SYSTEM, AND RACK

CROSS-REFERENCE TO RELATED APPLICATIONS

The present application is a U.S. National Stage application under 35 U.S.C. § 317 of International Patent Application No. PCT/CN2021/097869, filed on Jun. 2, 2021, which is based on and claims the priority to the Chinese patent application No. 202010512870.2 filed on Jun. 8, 2020, the disclosures of both of which are hereby incorporated in their entireties into the present application.

TECHNICAL FIELD

This disclosure relates to the field of warehousing, and particularly, to an order reviewing method, device and system and a rack.

BACKGROUND

With the rapid development of e-commerce, the number of daily orders in a warehouse is increasing day by day, and order review of commodities in the warehouse is a key link of operations in the warehouse. The order review is intended to put together multiple commodities contained in each order in preparation for package and distribution.

In the related art, it is necessary to place a turnover box in a corresponding rack location, and then place commodities in an order in the turnover box of the corresponding location, to complete the order review.

SUMMARY

A technical problem to be solved by the present disclosure is to provide an order reviewing method, device and system and a rack, capable of reducing an error rate of order review.

According to one aspect of the present disclosure, there is provided an order reviewing method, comprising: determining an order number of an order to which a commodity belongs; prompting a location on a rack corresponding to the commodity according to a correspondence between an order number and a location number of a location; in response to the commodity being placed on the corresponding location, determining whether the order has been reviewed; and if the order has been reviewed, sending a flipping instruction to a flipping system corresponding to the order according to a correspondence between an order and a device number of a flipping system, wherein a flip assembly of each flipping system corresponds to one location and is configured to close an inlet of the one location.

In some embodiments, if the order to which the commodity belongs has been reviewed, a state switching instruction is sent to an indicating device corresponding to the order according to a correspondence between an order and a device number of an indicating device.

In some embodiments, a location number of a location where the commodity is placed is acquired; and if the location number of the location where the commodity is placed is consistent with a location number of the prompted location, it is determined that the commodity is in place.

In some embodiments, a device number of a flipping system corresponding to a location where the commodity is placed is acquired; and if the device number of the flipping system corresponding to the location where the commodity is placed is consistent with a device number of a flipping system corresponding to a prompted location, it is determined that the commodity is in place.

In some embodiments, after the indicating device executes the state switching instruction, an operator is allowed to pack a commodity of a location in response to the operator clicking a state switching button of the indicating device.

In some embodiments, the state switching button comprises a first button and a second button; and the first button and the second button are respectively in information binding with operators.

In some embodiments, it is determined whether all orders in a review task list have been reviewed, wherein the review task list corresponds to at least one order; if all orders in the review task list have been reviewed, it is determined whether state switching buttons of an indicating device corresponding to all orders have all been clicked; if the state switching buttons of the indicating device corresponding to all order are not all clicked, an operator is prompted to click a non-clicked state switching button; and if the state switching buttons of the indicating device corresponding to all orders are all clicked, a review task list is issued again.

According to another aspect of the present disclosure, there is further provided an order reviewing device, comprising: an order number determination unit configured to determine an order number of an order to which a commodity belongs; a location prompting unit configured to prompt a location on a rack corresponding to the commodity according to a correspondence between an order number and a location number of a location; a review unit configured to, in response to the commodity being placed on the location, determine whether the order has been reviewed; and a flipping instruction unit configured to, if the order has been reviewed, send a flipping instruction to a flipping system corresponding to the order according to a correspondence between an order and a device number of a flipping system, wherein a flip assembly of each flipping system corresponds to one location and is configured to close an inlet of the one location.

According to another aspect of the present disclosure, there is further provided an order reviewing device, comprising: a memory; and a processor coupled to the memory, the processor being configured to perform, based on instructions stored in the memory, the order reviewing method as described above.

According to another aspect of the present disclosure, there is further provided a rack, comprising: at least one rack layer, each rack layer being provided with a partitioning structure configured to partition the rack layer into at least two locations; and a flipping system corresponding to each location, comprising a flip assembly configured to close an inlet of the location according to a flipping instruction sent from an order reviewing system after it is determined that an order to which a commodity belongs has been reviewed.

In some embodiments, a vertical height of the inlet of each location is greater than a vertical height of an outlet.

In some embodiments, the partitioning structure is slidably provided on the rack layer.

In some embodiments, the flipping system further comprises: a driving motor configured to drive the flip assembly to close the inlet of the location.

In some embodiments, an indicating device corresponding to each location is configured to perform state switching according to a state switching instruction sent from the order reviewing device after it is determined that the order to which the commodity belongs has been reviewed.

According to another aspect of the present disclosure, there is further provided an order reviewing system, comprising: the order reviewing device described above; and the rack described above.

According to another aspect of the present disclosure, there is further provided a non-transitory computer-readable storage medium having stored thereon computer program instructions which, when executed by a processor, implement the order reviewing method described above.

In the embodiments of the present disclosure, according to the correspondence between an order number and a location number of a location, the location corresponding to the commodity is prompted, and after the order to which the commodity belongs has been reviewed, the flipping instruction is sent to the flipping system corresponding to the order according to the correspondence between an order and a device number of a flipping system, so that the flip assembly of the flipping system closes the inlet of the location, which can prevent a subsequent commodity from being placed on the location to reduce the error rate of the order review.

Other features of the present disclosure and advantages thereof will become apparent from the following detailed description of exemplary embodiments thereof, which proceeds with reference to the accompanying drawings.

BRIEF DESCRIPTION OF THE DRAWINGS

The accompanying drawings, which constitute a part of this description, illustrate embodiments of the present disclosure and together with the description, serve to explain the principles of the present disclosure.

The present disclosure can be more clearly understood according to the following detailed description with reference to the accompanying drawings, in which.

DETAILED DESCRIPTION

Figure 1:
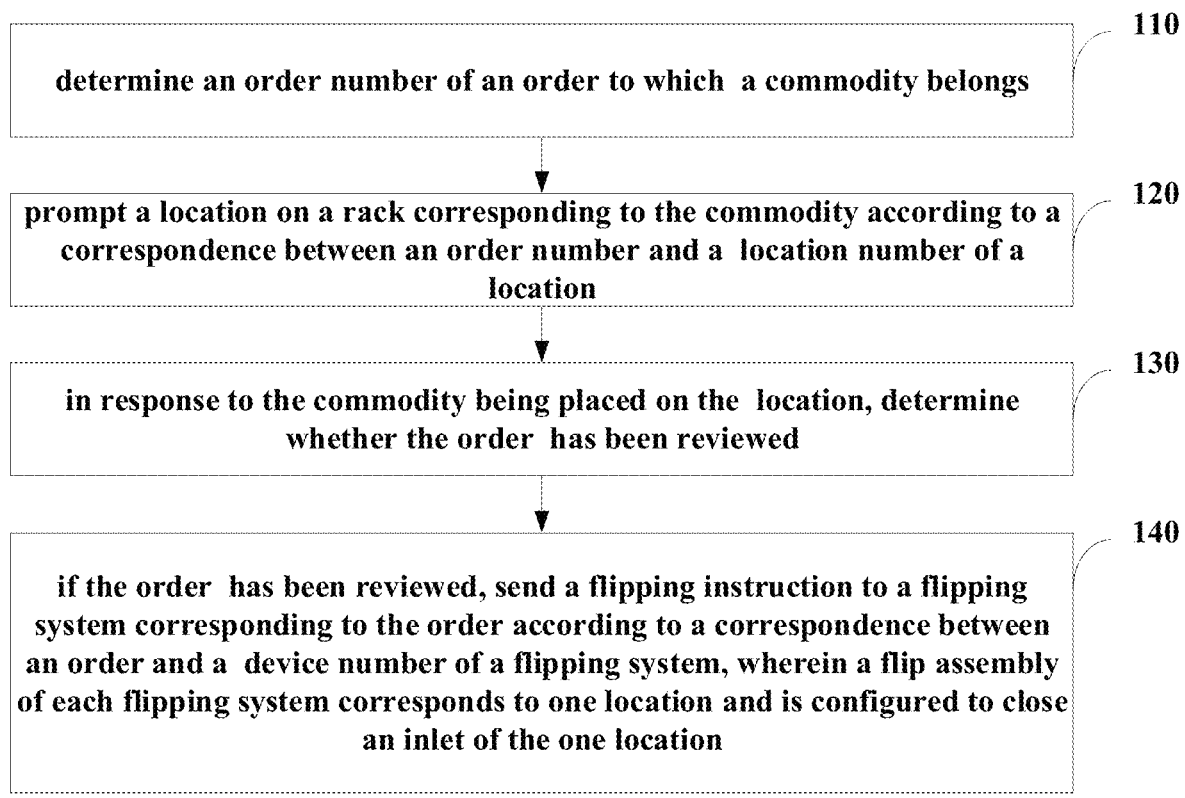
FIG. 1 is a flow diagram of an order reviewing method according to some embodiments of the present disclosure.

Various exemplary embodiments of the present disclosure will now be described in detail with reference to the accompanying drawings. It should be noted that: relative arrangements, numerical expressions and numerical values of components and steps set forth in these embodiments do not limit the scope of the present disclosure unless specifically stated otherwise.

Meanwhile, it should be understood that sizes of portions shown in the drawings are not drawn to an actual scale for ease of description.

The following description of at least one exemplary embodiment is merely illustrative in nature and is in no way intended to serves as any limitation on this disclosure, and its application or use.

A technique, method, and device known to one of ordinary skill in the related art may not be discussed in detail but is intended to be part of the granted specification where appropriate.

In all examples shown and discussed herein, any specific value should be construed as exemplary only and not as limiting. Therefore, other examples of the exemplary embodiments can have different values.

It should be noted that: similar reference numbers and letters refer to similar items in the following drawings, and thus, once a certain item is defined in one drawing, it need not be discussed further in the following drawings.

To make the objective, technical solution and advantage of the present disclosure more apparent, the present disclosure will be further described in detail below in conjunction with specific embodiments and with reference to the accompanying drawings.

FIG. 1 is a flow diagram of an order reviewing method according to some embodiments of the present disclosure. This embodiment is performed by an order reviewing device, for example, WMS (Warehouse Management System).

At step 110, an order number of an order to which a commodity belongs is determined.

For example, a reviewing operator scans a barcode on a commodity through a handheld scanning gun, the barcode information of the commodity is sent to an order reviewing device, and the order reviewing device determines an order number corresponding to the commodity through the barcode information of the commodity.

At step 120, a location (i.e. storage space) on a rack (i.e. shelf) corresponding to the commodity is prompted according to a correspondence between an order number and a location number of a location.

In some embodiments, each location on a rack is provided with a location number, the order reviewing device presets the correspondence between an order number and a location number, and prompts the location number and the location corresponding to the commodity to the operator according to the correspondence between an order number and a location number, and the operator can place the commodity on the location.

At step 130, in response to the commodity being placed on the location, it is determined whether the order has been reviewed.

In some embodiments, the order reviewing device needs to determine whether the commodity is placed on correct location. For example, a location number of a location where the commodity is placed is acquired; and if the location number of the location where the commodity is placed is consistent with a location number of the prompted location, it is determined that the commodity is in place. Or, a device number of a flipping system corresponding to a location where the commodity is placed is acquired; and if the device number of the flipping system corresponding to the location where the commodity is placed is consistent with a device number of a flipping system corresponding to the prompted location, it is determined that the commodity is in place.

In some embodiments, if the order reviewing device determines that all commodities in one order are placed on correct locations, it is determined that the order has been reviewed.

At step 140, if the order has been reviewed, a flipping instruction is sent to a flipping system corresponding to the order according to a correspondence between an order and a device number of a flipping system, wherein a flip assembly of each flipping system corresponds to one location and is configured to close an inlet of the one location.

In the above embodiment, the location corresponding to the commodity is prompted according to the correspondence between an order number and a location number, and after the order to which the commodity belongs has been reviewed, the flipping instruction is sent to the flipping system corresponding to the order according to the correspondence between an order and a device number of a flipping system, so that the flip assembly of the flipping system closes the inlet of the location, which can prevent a subsequent commodity from being placed on the location, to reduce the error rate of the order review.

In other embodiments of the present disclosure, if the order to which the commodity belongs has been reviewed, a state switching instruction is sent to an indicating device corresponding to the order according to a correspondence between an order and a device number of an indicating device.

The indicating device is, for example, an electronic tag, which is provided, for example, on another side of the location where the flipping system is located. The electronic tag is provided with an indicator light. For example, after a certain order has been reviewed, an order reviewing device sends a lighting indication to an electronic tag corresponding to the order, and the indicator light is lighted to prompt that a packer can perform corresponding packing operation. It should be appreciated by those skilled in the art that in this embodiment, light on indicates that the order review has been completed, or light off can also indicate that the order review has been completed.

In some embodiments, after the indicating device executes the state switching instruction, the operator is allowed to pack the commodity of the location in response to the operator clicking a state switching button of the indicating device.

For example, the electronic tag is provided with a lighting button, and for example, after a packer sees that an indicator light goes on, he determines that order review has been completed, and presses the button to make the indicator light go out, thereby starting packing a commodity. If the indicator light is not lighted, it is indicated that the order review is not completed, and in this case, the operator is not allowed to pack the commodity of the location, which prevents an incomplete order from affecting customer experience.

In the above embodiment, after one order review is completed, packing is performed immediately, and compared with the past when it is necessary to wait for completing reviews of all orders before packing can be performed, the whole commodity picking efficiency is improved.

In some embodiments, the state switching button comprises a first button and a second button; and the first button and the second button are respectively in information binding with corresponding operators.

For example, in the case where one reviewing station corresponds two packing stations, the electronic tag can be provided with two lighting buttons, and each lighting button is in information binding with different packers, and different packers can, by pressing their respective lighting buttons, get their own packing tasks to pack a commodity, which is convenient for the order reviewing device to track the order.

Figure 2:
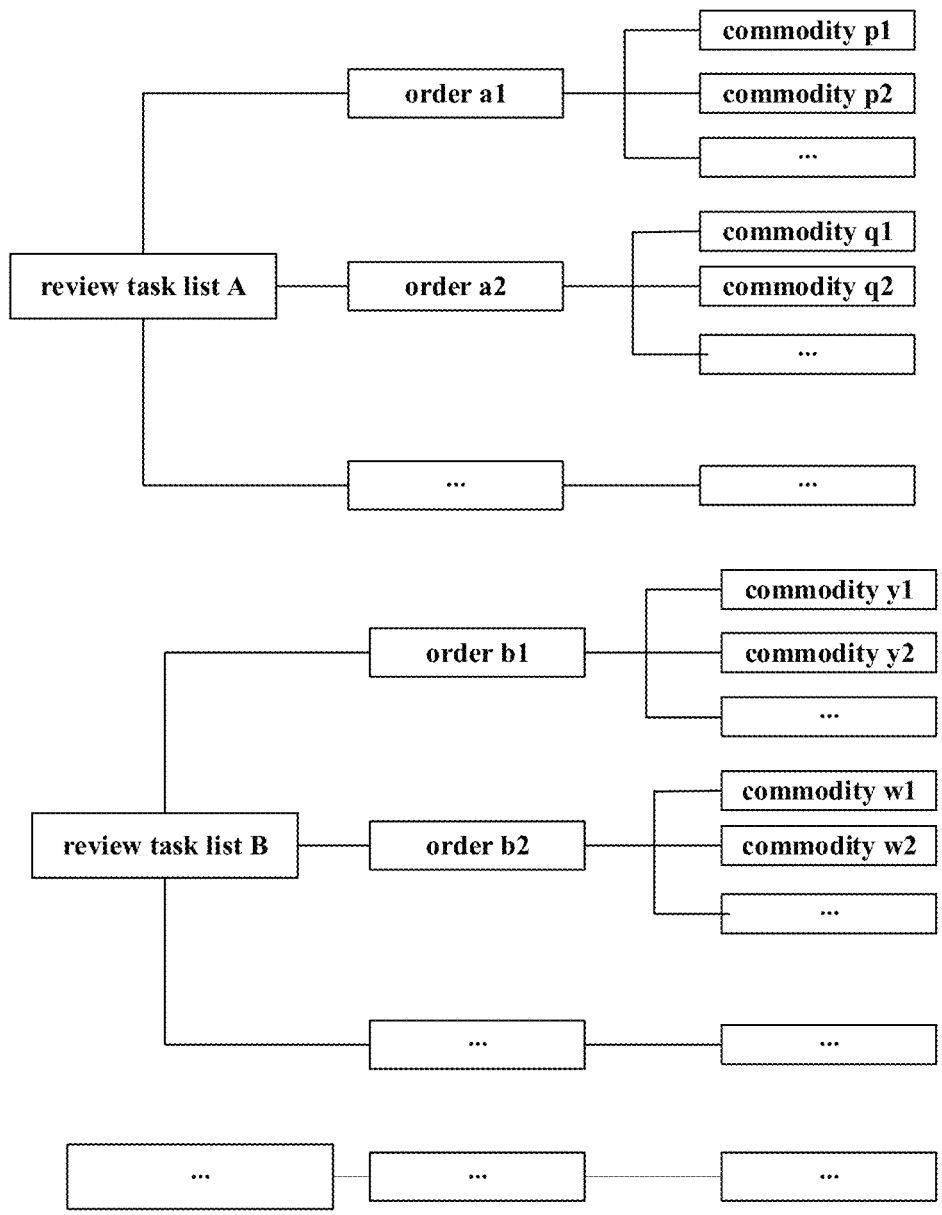
FIG. 2 is a schematic diagram of a review task list.

In other embodiments of the present disclosure, it is determined whether all orders in a review task list have been reviewed, wherein the review task list corresponds to at least one order, as shown in FIG. 2. If all orders in the review task list have been reviewed, it is determined whether state switching buttons of indicating devices corresponding to all orders have all been clicked; if the state switching buttons of the indicating devices corresponding to all orders are not all clicked, an operator is prompted to click a non-clicked state switching button; and if the state switching buttons of the indicating devices corresponding to all orders are all clicked, a review task list is issued again.

For example, indicator lights of electronic tags corresponding to all orders in one review task list are not all turned off, that is, reviewed orders are not all packed by a packer, the packer is prompted to turn off all indicator lights that are on and transfer commodities to a corresponding packing table for temporary storage, to facilitate subsequent packing. Then, review for a next review task list can be performed.

Figure 3:
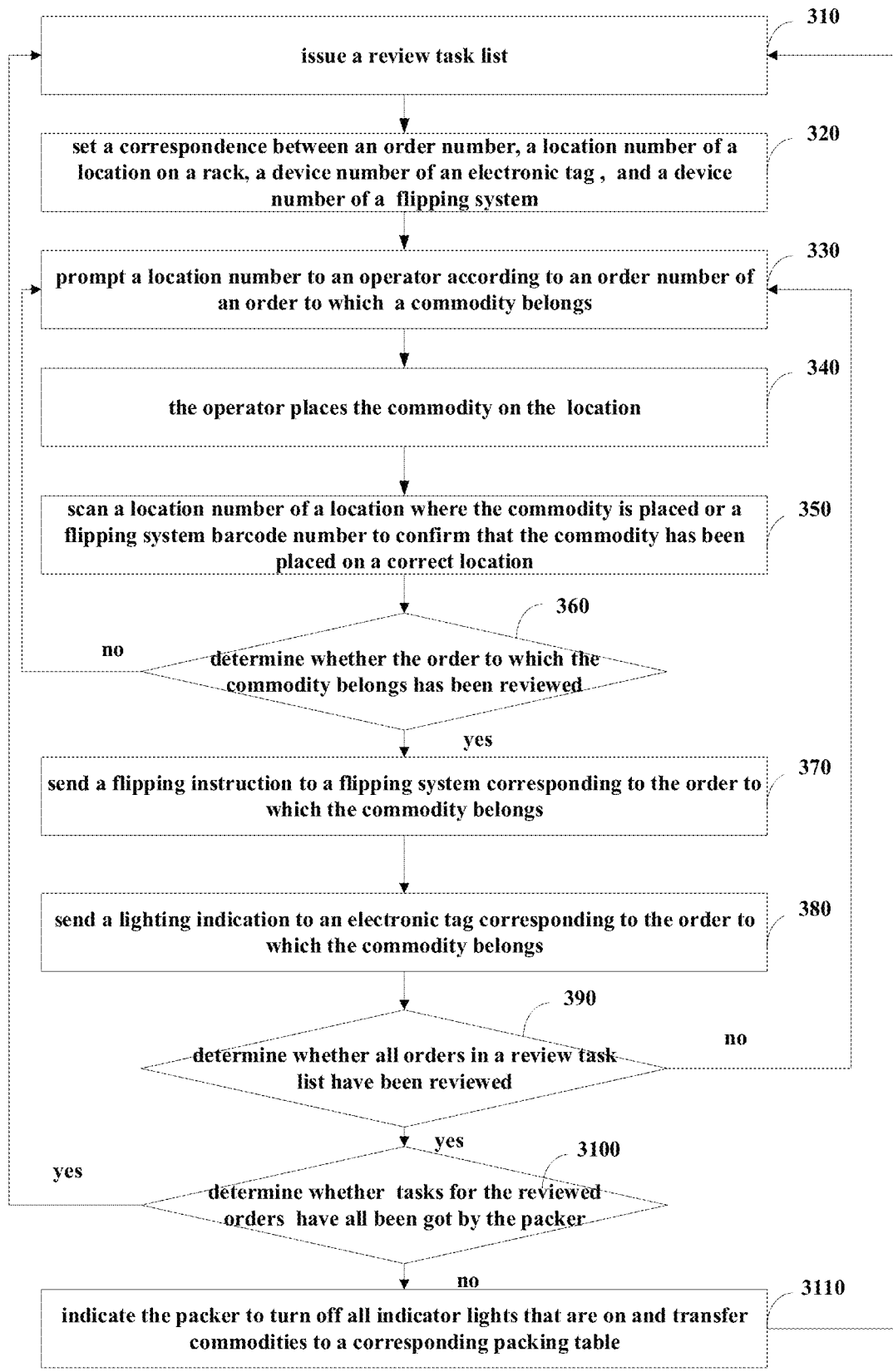
FIG. 3 is a flow diagram of an order reviewing method according to other embodiments of the present disclosure.

FIG. 3 is a flow diagram of an order reviewing method according to other embodiments of the present disclosure.

At step 310, a review task list is issued.

At step 320, a correspondence between an order number, a location number of a location on a rack, a device number of an electronic tag, and a device number of a flipping system is set.

For example, one side of one location is provided with a flipping system and the other side thereof is provided with an electronic tag.

At step 330, a location number is prompted to an operator according to an order number of an order to which a commodity belongs.

At step 340, the operator places the commodity on the location.

At step 350, a location number of a location where the commodity is placed or a flipping system barcode number is scanned to confirm that the commodity has been placed on a correct location.

At step 360, it is determined whether the order to which the commodity belongs has been reviewed, and if the order has been reviewed, step 370 is performed, otherwise, step 330 is performed.

At step 370, a flipping instruction is sent to a flipping system corresponding to the order to which the commodity belongs.

When all commodities in the order have been reviewed, the flipping system corresponding to the location automatically flips downwards to remind the operator that the commodities have been reviewed, and meanwhile, prevent the operator from placing other commodities in the location due to maloperation.

At step 380, a lighting indication is sent to an electronic tag corresponding to the order to which the commodity belongs.

After the order has been reviewed, an indicator light of the electronic tag arranged opposite to the flipping system device of the location is turned on, to prompt that an packer on the opposite side can perform packing operation.

At step 390, it is determined whether all orders in a review task list have been reviewed, and if the orders have been reviewed, step 3100 is performed, otherwise, step 330 is performed.

The order reviewing task is repeatedly executed until all commodities in the review task list have been reviewed.

At step 3100, it is determined whether tasks for the reviewed orders have all been got by the packer, and if the tasks have all been got, step 310 is performed, otherwise, step 3110 is performed.

After the order review for one review task list has been completed, the order review for a next review task list is performed until review for all review task lists is completed.

At step 3110, the packer is indicated to turn off all indicator lights that are on and transfer commodities to a corresponding packing table, and then step 310 can be performed.

In this embodiment, according to the correspondence between an order number, a location number, a device number of an electronic tag and a device number of a flipping system, each commodity in the order is placed on the corresponding location, so that the order review efficiency is improved, and after one order has been reviewed, a flipping assembly corresponding to the location closes an inlet of the location, so that a subsequent commodity can be prevented from being placed on the location. Moreover, the indicator light of the electronic tag corresponding to the location is turned on, to remind the packer to pack, and in this embodiment, after one order has been completed, the packing can be directly performed, so that the picking efficiency of the whole system is improved.

Figure 4:
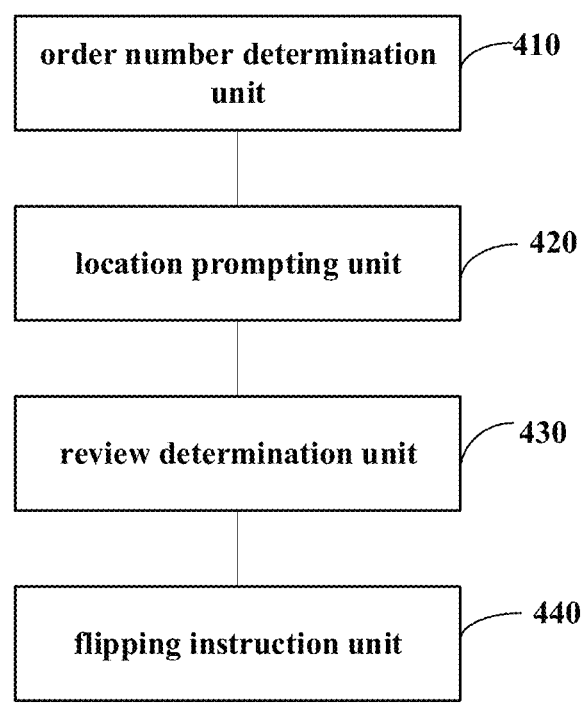
FIG. 4 is a schematic structural diagram of an order reviewing device according to some embodiments of the present disclosure.
Figure 5:
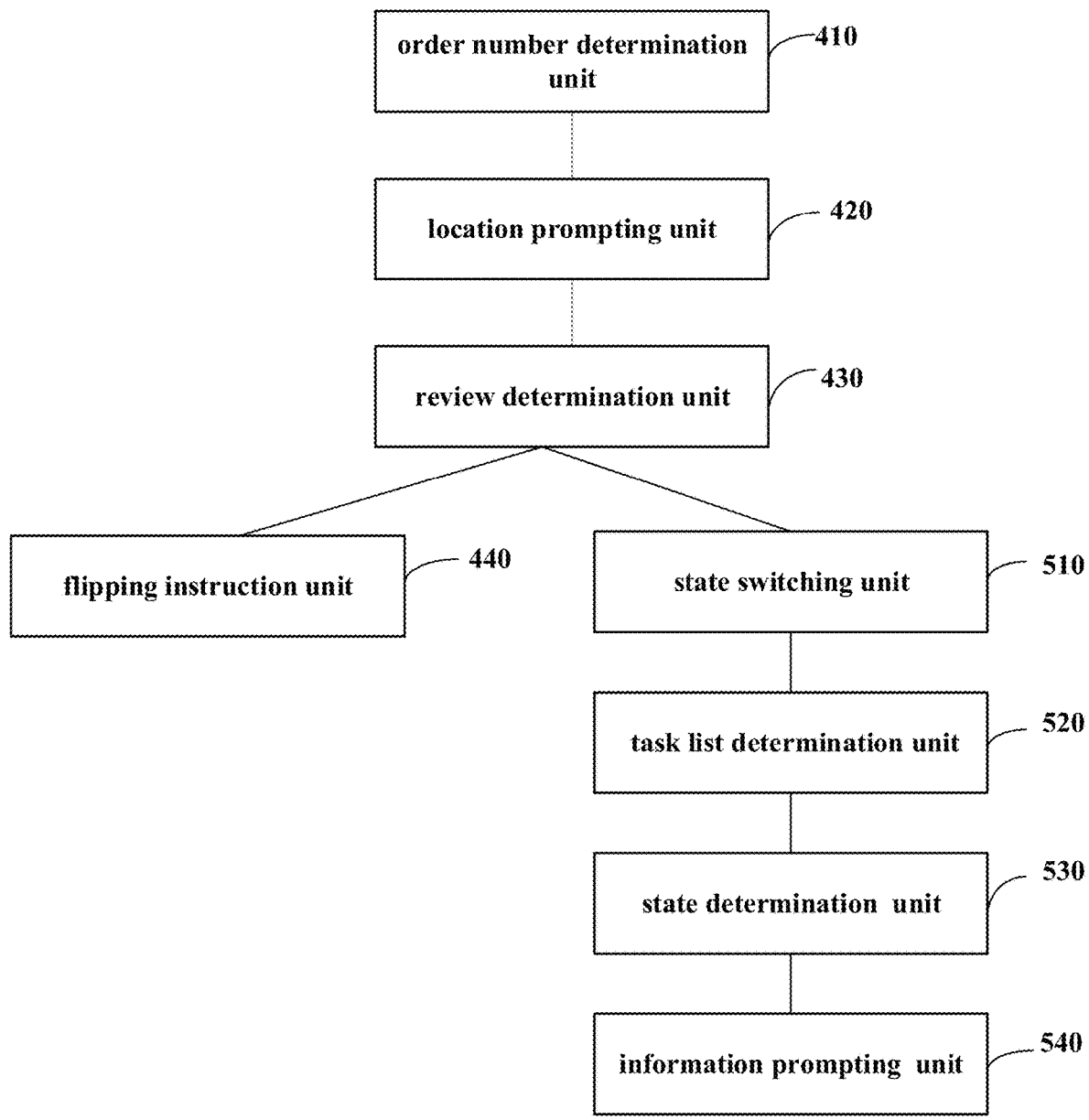
FIG. 5 is a schematic structural diagram of an order reviewing device according to other embodiments of the present disclosure.

FIG. 4 is a schematic structural diagram of an order reviewing device according to some embodiments of the present disclosure. The device comprises an order number determination unit 410, a location prompting unit 420, a review determination unit 430 and a flipping instruction unit 440.

The order number determination unit 410 is configured to determine an order number of an order to which a commodity belongs.

The location prompting unit 420 is configured to prompt a location on a rack corresponding to the commodity according to a correspondence between an order number and a location number of a location.

In some embodiments, each location on a rack is provided with a location number, an order reviewing device presets the correspondence between an order number and a location number of a location on a rack, and prompts a location number and position of the location corresponding to the commodity to an operator according to the correspondence between an order number and a location number of a location on a rack, and the operator can place the commodity on the location.

The review determination unit 430 is configured to determine whether the order to which the commodity belongs has been reviewed in response to the commodity being placed on the location.

In some embodiments, the review determination unit 430 acquires a location number of a location where the commodity is placed; and if the location number of the location where the commodity is placed is consistent with the prompted location number, it is determined that the commodity is in place. Or, a device number of a flipping system corresponding to a location where the commodity is placed is acquired; and if the device number of the flipping system corresponding to the location where the commodity is placed is consistent with a device number of a flipping system corresponding to the prompted location number, it is determined that the commodity is in place.

In some embodiments, if the review determination unit 430 determines that all commodities in one order are placed on correct locations, it is determined that the order has been reviewed.

The flipping instruction unit 440 is configured to, if the order to which the commodity belongs has been reviewed, send a flipping instruction to a flipping system corresponding to the order according to a correspondence between an order and a device number of a flipping system, wherein a flip assembly of each flipping system corresponds to one location and is configured to close an inlet of the one location.

In the above embodiment, the location corresponding to the commodity is prompted according to the correspondence between an order number and a location number of a location, and after the order to which the commodity belongs has been reviewed, the flipping instruction is sent to the flipping system corresponding to the order according to the correspondence between an order and a device number of a flipping system, so that the flip assembly of the flipping system closes the inlet of the one location, which can prevent a subsequent commodity from being placed on the location, to reduce the error rate of the order review.

In other embodiments of the present disclosure, the device further comprises a state switching unit 510 configured to, if the order to which the commodity belongs has been reviewed, send a state switching instruction to an indicating device corresponding to the order according to a correspondence between an order and a device number of an indicating device.

The indicating device is, for example, an electronic tag, which is provided, for example, on another side of the location where the flipping system is located. The electronic tag is provided with an indicator light, for example, after a certain order has been reviewed, the order reviewing device sends a lighting instruction to an electronic tag corresponding to this order, and the indicator light is lighted to prompt that a packer can perform packing.

In other embodiments, after the indicating device executes the state switching instruction, an operator is allowed to pack the commodity of the location in response to the operator clicking the state switching button of the indicating device.

In the above embodiment, after one order has been completed, packing can be directly performed, so that the picking efficiency of the whole system is improved.

In other embodiments, the device further comprises a task list determination unit 520, a state determination unit 530, and an information prompting unit 540.

The task list determination unit 520 is configured to determine whether all orders in a review task list have been reviewed, wherein the review task list corresponds to at least one order.

The state determination unit 530 is configured to, if all orders in the review task list have been reviewed, determine whether state switching buttons of indicating devices corresponding to all orders have all been clicked.

The information prompting unit 540 is configured to, if the state switching buttons of the indicating devices corresponding to all orders are not all clicked, prompt the operator to click a non-clicked state switching button. If the state switching buttons of the indicating devices corresponding to all orders are all clicked, a review task list is issued again.

Figure 6:
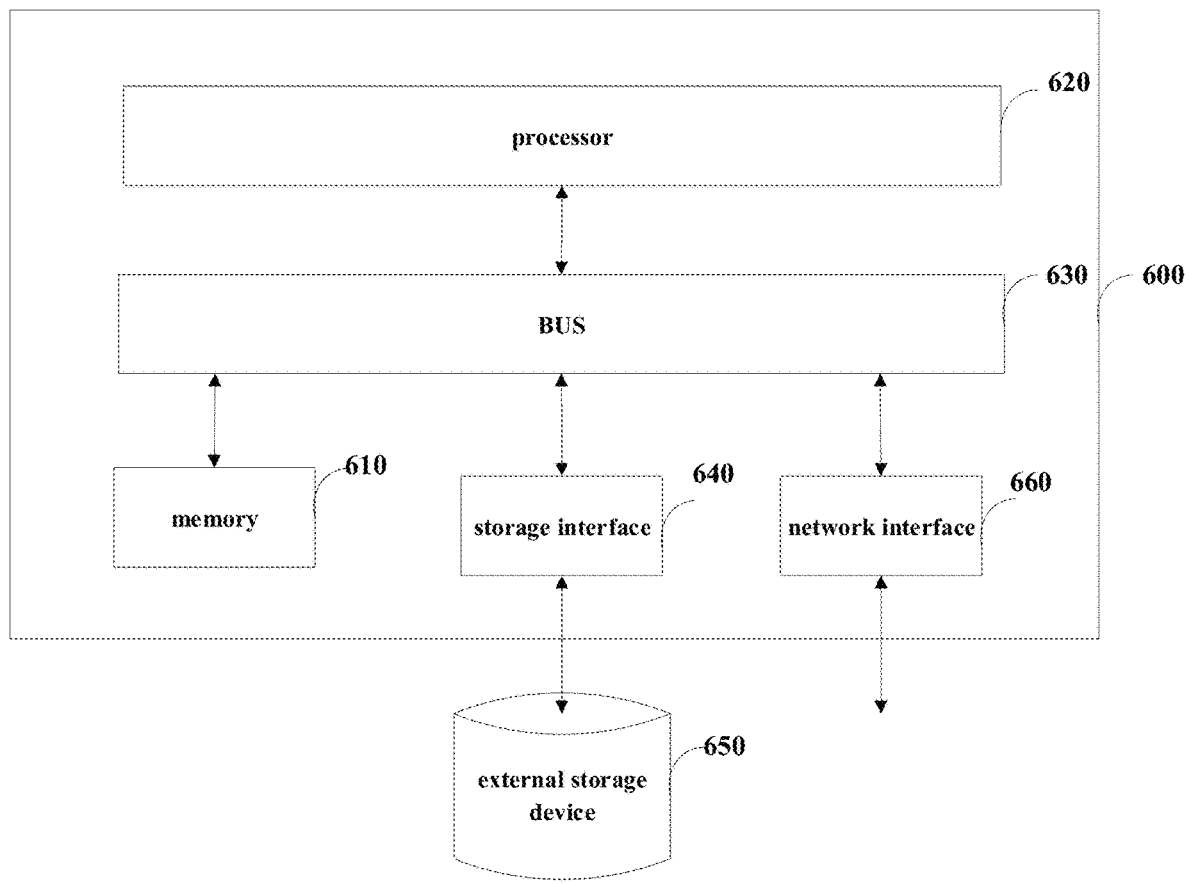
FIG. 6 is a schematic structural diagram of an order reviewing device according to other embodiments of the present disclosure.
Figure 7:
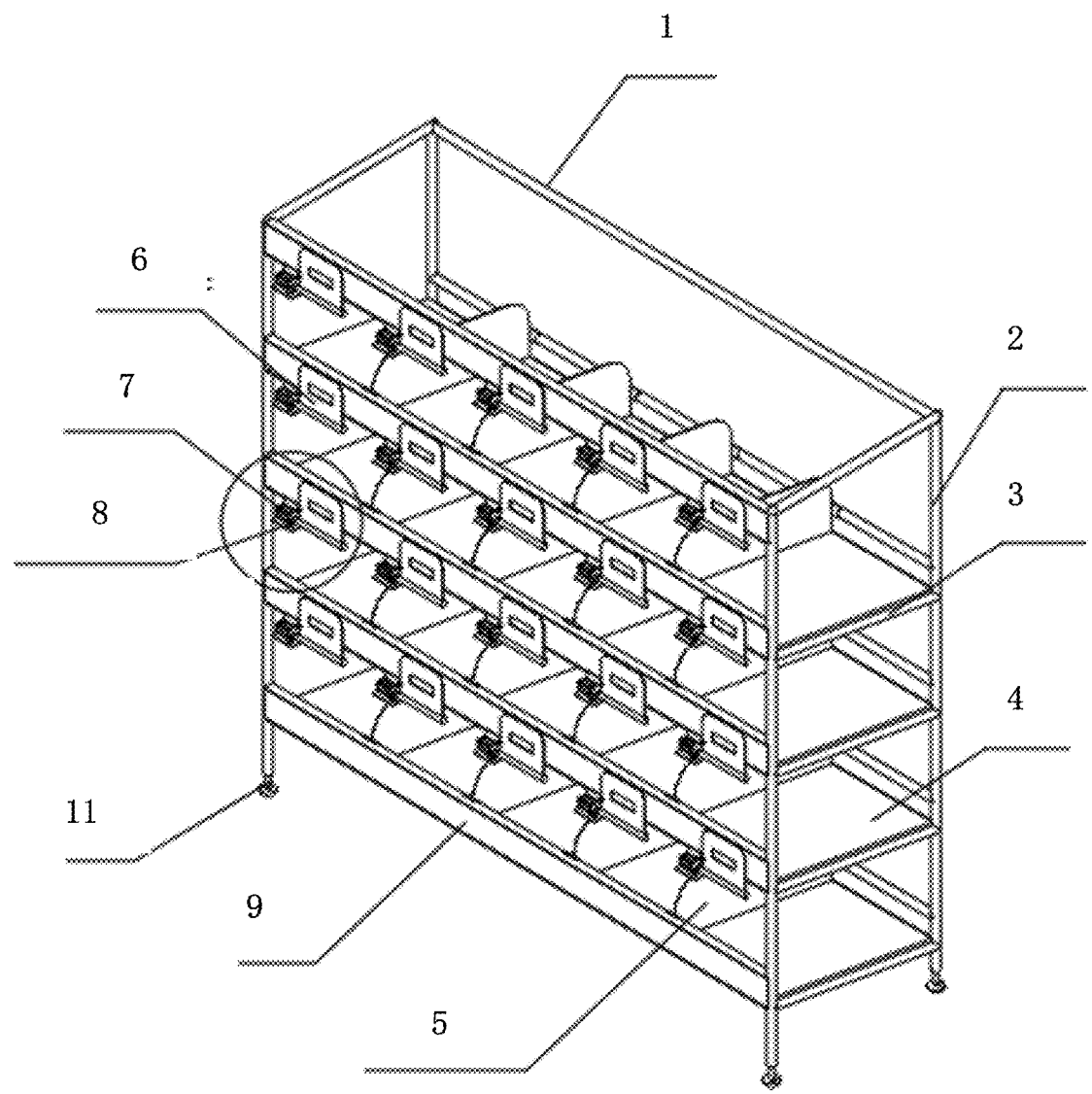
FIG. 7 is a schematic diagram of one perspective view of a rack according to the present disclosure.
Figure 8:
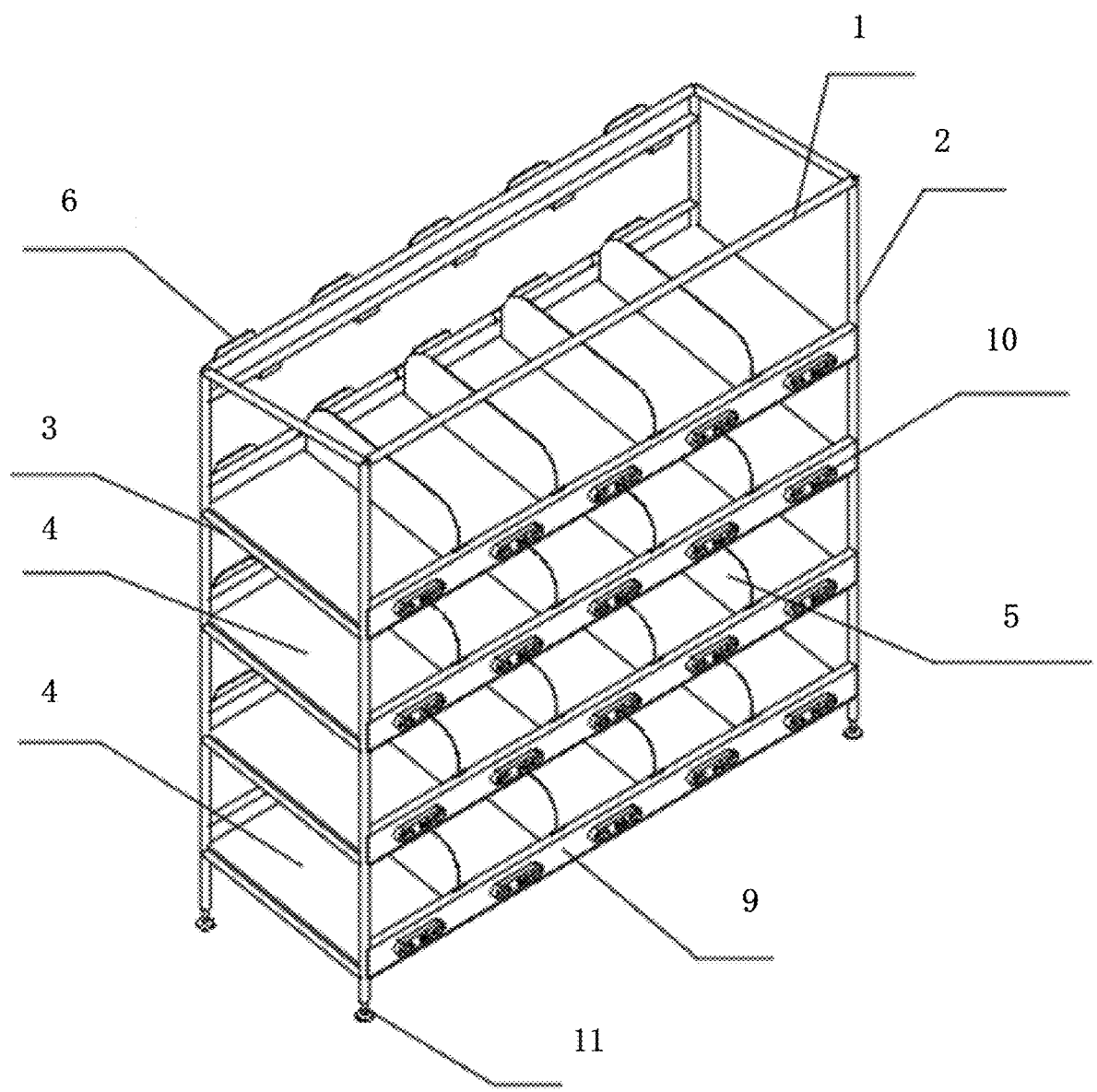
FIG. 8 is a schematic diagram of another perspective view of a rack according to the present disclosure.
Figure 9:
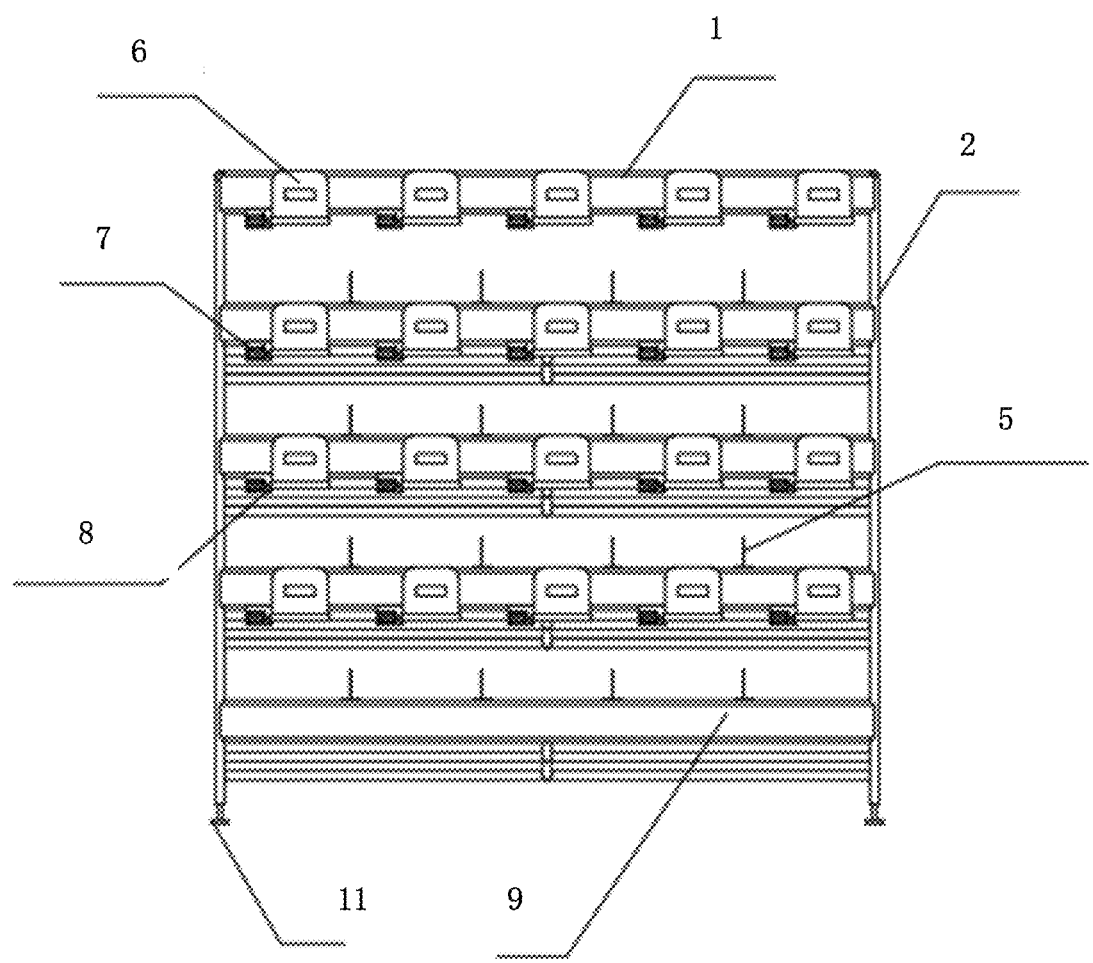
FIG. 9 is a front view of a rack according to the present disclosure.
Figure 10:
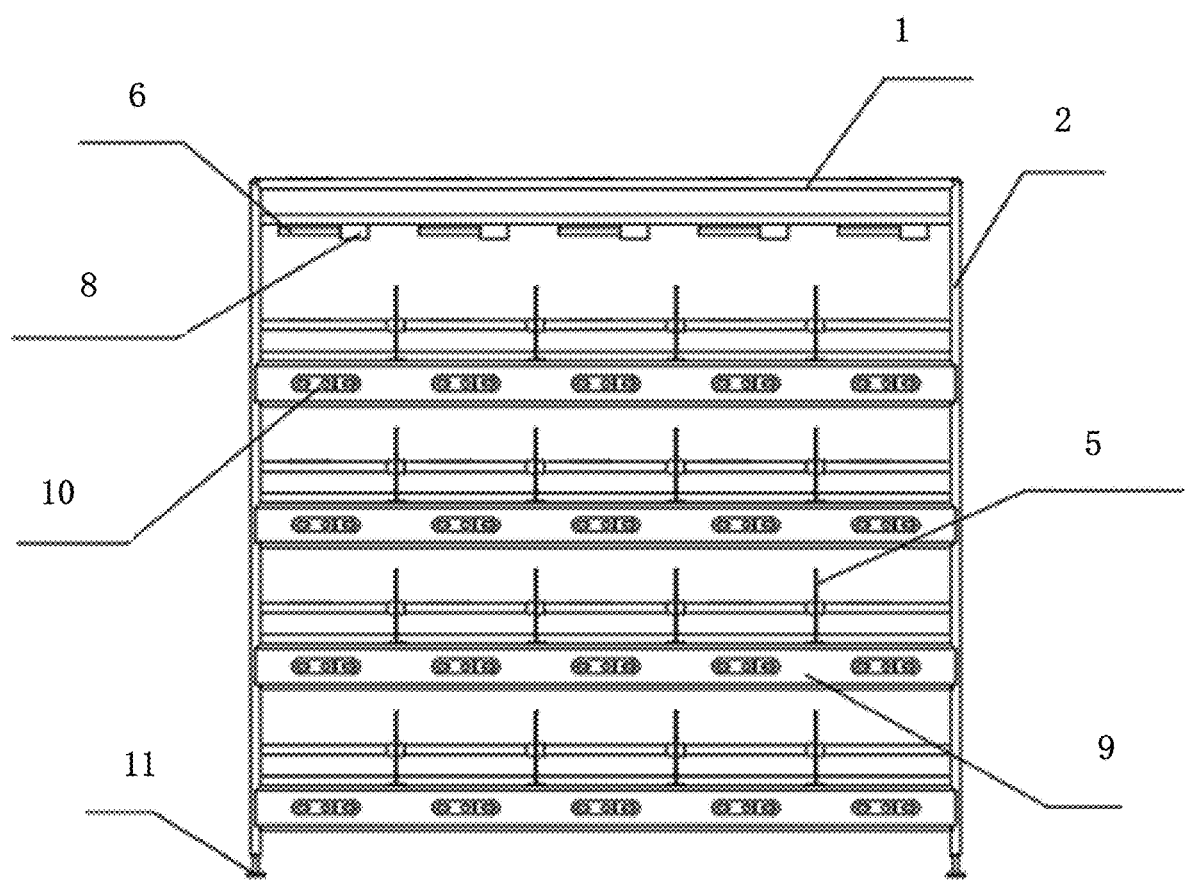
FIG. 10 is a rear view of a rack according to the present disclosure.
Figure 11:
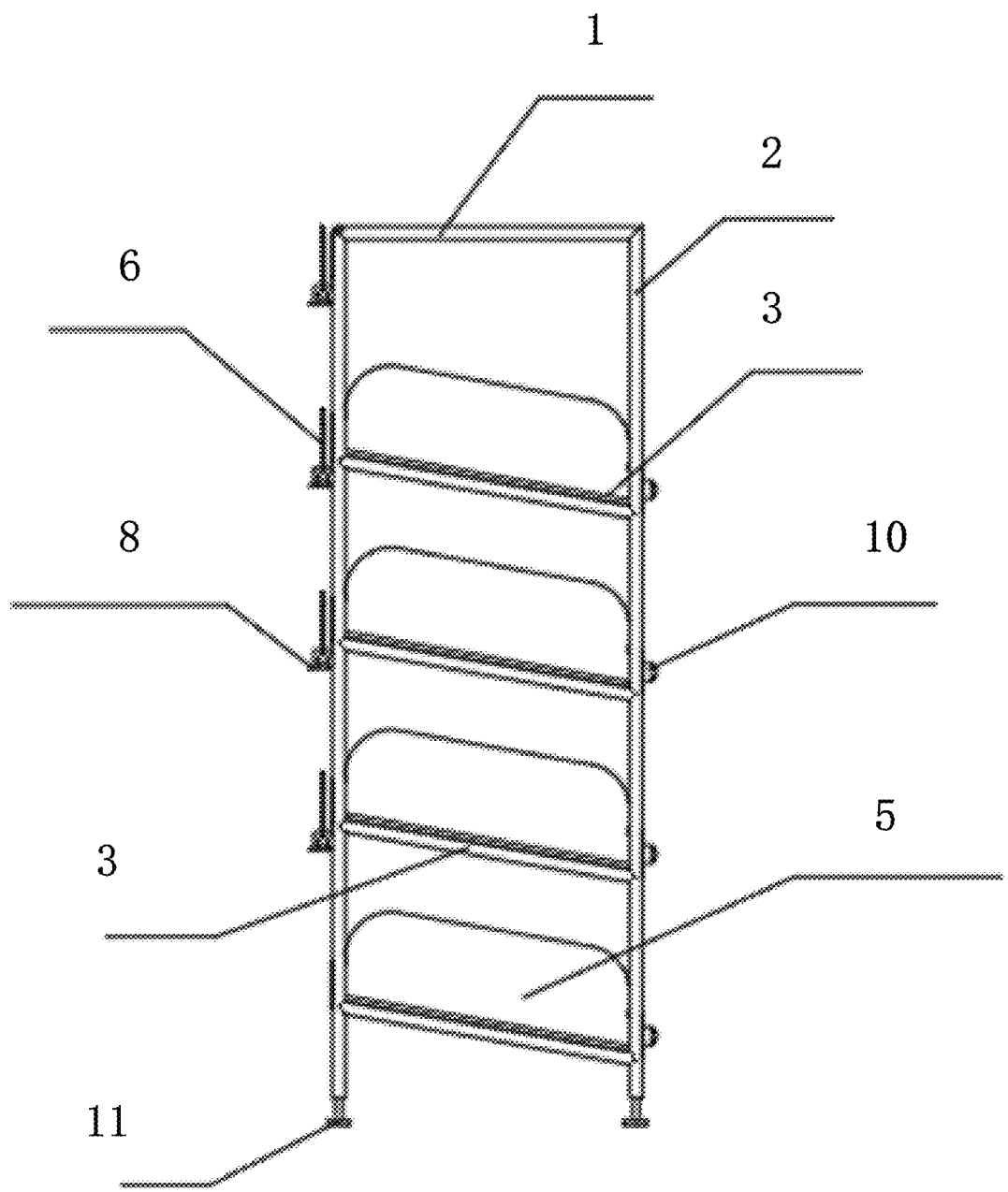
FIG. 11 is a side view of a rack according to the present disclosure.

FIG. 6 is a schematic structural diagram of an order reviewing device according to other embodiments of the present disclosure. The device 600 comprises a memory 610 and a processor 620, wherein: the memory 610 can be a magnetic disk, flash memory, or any other non-volatile storage medium. The memory is configured to store the instructions in the embodiments corresponding to FIGS. 1 to 3. The processor 620, which is coupled to the memory 610, can be implemented as one or more integrated circuits, such as a microprocessor or microcontroller. The processor 620 is configured to execute the instructions stored in the memory.

In some embodiments, the processor 620 is coupled to the memory 610 through a BUS 630. The device 600 can also be connected to an external storage device 650 through a storage interface 640 to call external data, and can also be connected to a network or another computer system (not shown) through a network interface 660, which will not be described in detail herein.

In this embodiment, by storing the data instructions by the memory and processing the instructions by the processor, the error rate of the order review can be reduced.

In other embodiments of the present disclosure, a rack is protected, the rack comprising at least one rack layer, each rack layer being provided with a partitioning structure, the partitioning structure being configured to partition the rack layer into at least two locations; and a flipping system corresponding to each location, the flipping system comprising a flip assembly configured to close an inlet of the location according to a flipping instruction sent from an order reviewing system after it is determined that an order to which a commodity belongs has been reviewed.

As shown in FIGS. 7 to 11, the rack comprises several crossbars 1, several uprights 2, several side bars 3, and several shelves 4, wherein how many shelves there are indicates how many rack layers the rack contains.

Figure 12:
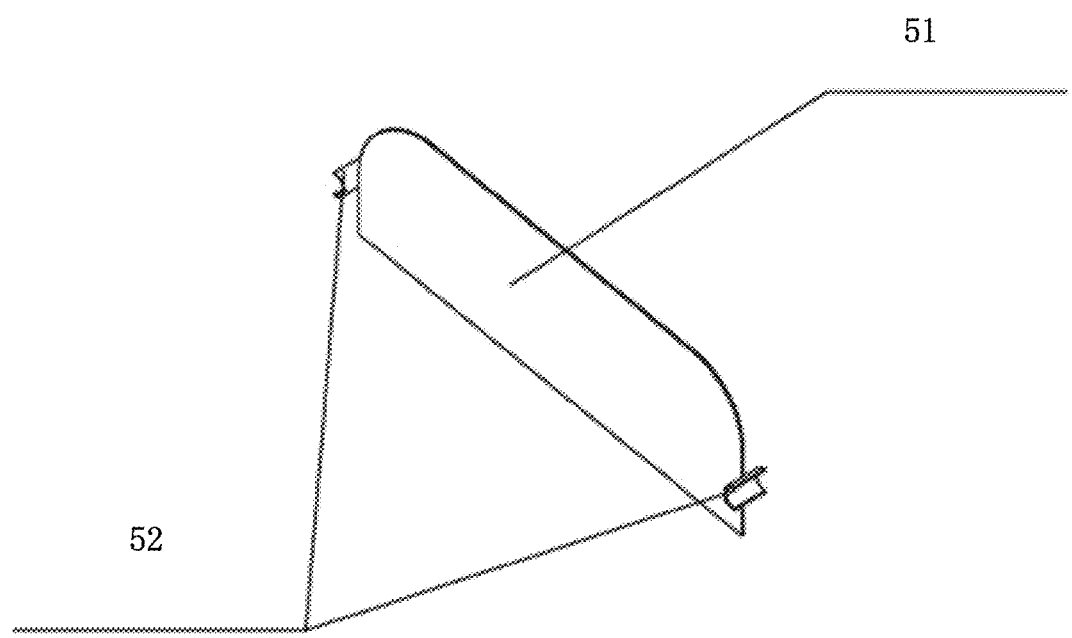
FIG. 12 is a schematic structural diagram of a partitioning assembly according to some embodiments of the present disclosure.

The rack further comprises several partitioning structures 5, primarily for physically isolating location corresponding to each order. As shown in FIG. 12, the partitioning structure 5 comprises, for example, a partitioning plate 51 and a guiding sleeve 52. In some embodiments, the partitioning structure 5 is slidably provided on the rack layer. The guiding sleeve 52 is fixed on both sides of the partitioning plate 51, the guiding sleeve 52 is used for connecting with the crossbar 1 on each layer, and the guiding sleeve 52 is provided with a structure having a radian consistent with the crossbar 1, so as to facilitate leftward and rightward movement on the crossbar 1. When a volume of a commodity in a certain order is too large to be placed on an existing location, the partitioning structure 5 can be moved properly to ensure that the commodity is smoothly placed on the location. In some embodiments, an outside of the partitioning plate 51 is provided with a rounded corner to prevent an operator from being bruised.

Figure 13:
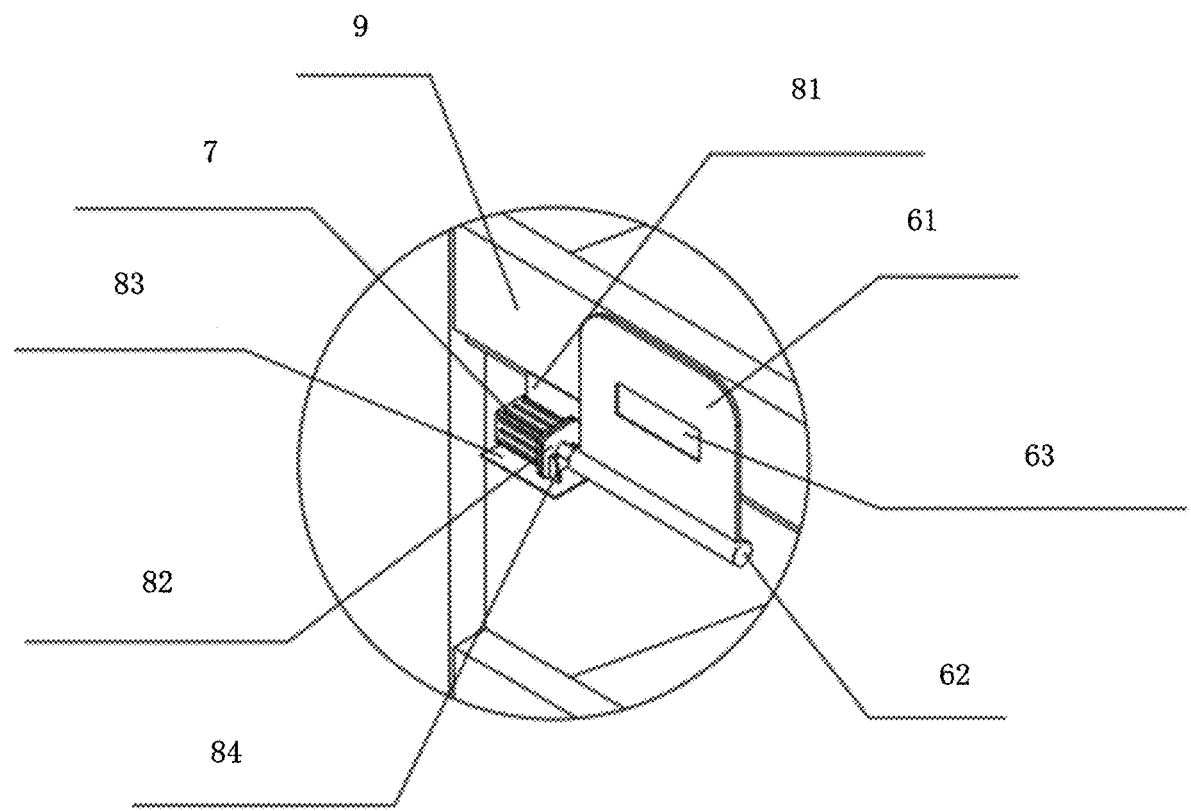
FIG. 13 is a schematic structural diagram of a flipping system according to some embodiments of the present disclosure.

The rack comprises several flip assemblies 6 and several driving motors 7, wherein the flip assembly 6 and the driving motor 7 form the flipping system, and the driving motor 7 is configured to drive the flip assembly 6 to close an inlet of the location. As shown in FIG. 13, the flip assembly 6 comprises a flipping plate 61 and a flipping shaft 62, wherein the flipping plate 61 is provided with several barcode mounting grooves 63, and the barcode mounting groove 63 is used for pasting a flipping system barcode number. The driving motor 7 is fixed on a baffle 9 by a mounting bracket assembly 8. The mounting bracket assembly 8 comprises a mounting side plate 81, a mounting fixing plate 82, a mounting base plate 83, and a supporting rib plate 84. The baffle 9 is fixed on the crossbar 1 for sheltering a commodity from dropping outside the rack device, and meanwhile, can also be used for pasting a location barcode number.

Figure 14:
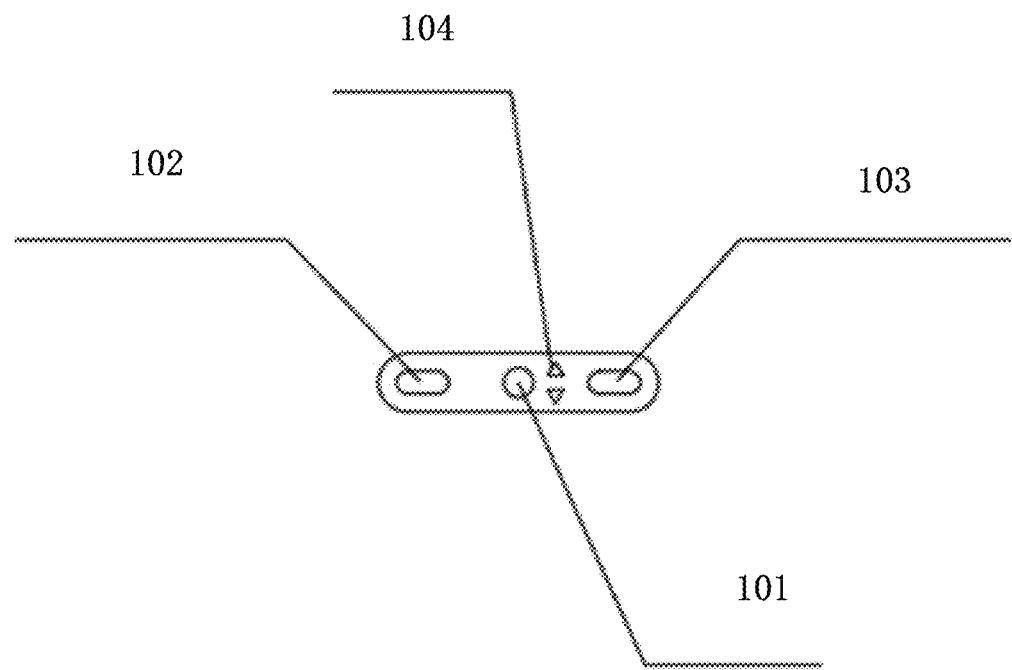
FIG. 14 is a schematic structural diagram of an electronic tag according to some embodiments of the present disclosure.
Figure 15:
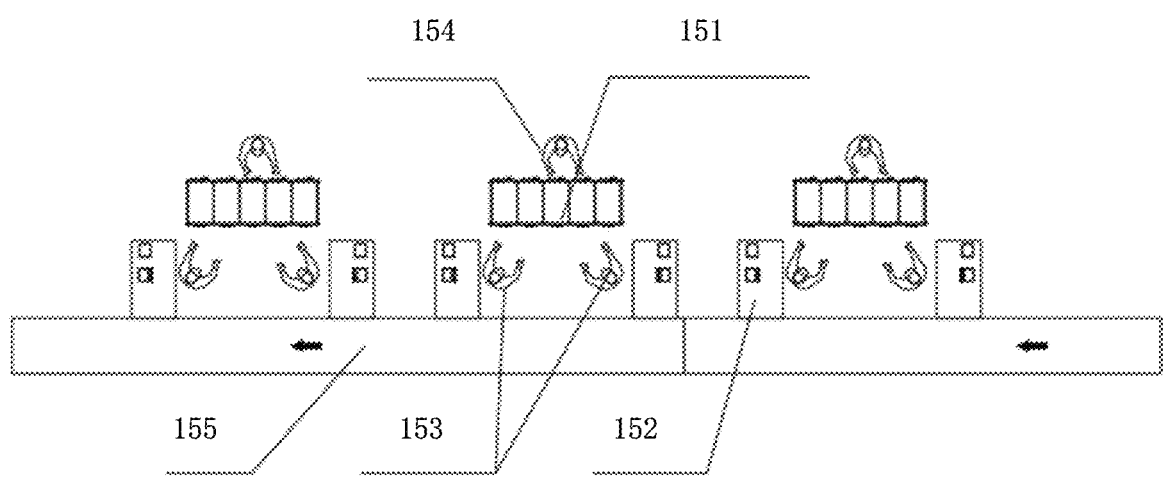
FIG. 15 is an order reviewing production layout according to the present disclosure.

The rack further comprises an indicating device 10 corresponding to each location, wherein the indicating device is configured to perform state switching according to a state switching instruction sent from an order reviewing device after it is determined that an order to which a commodity belongs has been reviewed. The indicating device 10 is, for example, an electronic tag. As shown in FIG. 14, the electronic tag is provided with an indicator light 101, a first lighting button 102, a second lighting button 103, and an operation button 104. In case where one reviewing station 151 corresponds to two packing stations 152 shown in FIG. 15, the first lighting button 101 and the second lighting button 102 are in information binding with different packing operators 153, and the one reviewing station can be used by one reviewing operator 154. A packing operator gets his/her own packing task by pressing a lighting button in information binding with himself/herself, and the packed commodity is transmitted through a transmission line 155. When the lighting button is pressed down, the start of the packing operation is triggered simultaneously, so that the packer repeatedly scanning the barcode information of the order is omitted, which improves the operation efficiency, and meanwhile, can match the operation efficiency of review and package.

In some embodiments, a vertical height of the inlet of each location is greater than a vertical height of an outlet, i.e. the shelf 4 is fixed obliquely on the side bar 3 and the crossbar 1. An upper side of the shelf 4 is provided with the flip assembly 6 and a lower side of the shelf 4 is provided with the electronic tag 10. When a reviewer places the commodity on the shelf 4 of the location, under the effect of gravity, the commodity can automatically move to one side close to the packer, which reduces the action that the packer carries the commodity, and improves the operation efficiency.

In some embodiments, the rack further comprises a foot 11 to facilitate movement of the rack.

In other embodiments of the present disclosure, an order reviewing system is protected, wherein the order reviewing system comprises the order reviewing device and the rack described above.

In other embodiments, a computer-readable storage medium has stored thereon computer program instructions which, when executed by a processor, implement the steps of the method in the embodiments corresponding to FIGS. 1 to 3. It should be appreciated by those skilled in the art that, the embodiments of the present disclosure can be provided as a method, apparatus, or computer program product. Accordingly, the present disclosure can take a form of an entire hardware embodiment, an entire software embodiment or an embodiment combining software and hardware aspects. Moreover, the present disclosure can take a form of a computer program product implemented on one or more computer-usable non-transitory storage media (including, but not limited to, disk memories, CD-ROMs, optical memories, and so forth) having computer-usable program code embodied therein.

The present disclosure is described with reference to flow diagrams and/or block diagrams of the method, apparatus (system) and computer program product according to the embodiments of the disclosure. It should be understood that each flow and/or block of the flow diagrams and/or block diagrams, and a combination of flows and/or blocks in the flow diagrams and/or block diagrams, can be implemented by computer program instructions. These computer program instructions can be provided to a processor of a general-purpose computer, special-purpose computer, embedded processor, or other programmable data processing devices to produce a machine, such that the instructions, which are executed by the processor of the computer or other programmable data processing devices, create means for implementing the functions specified in one or more flows of the flow diagrams and/or one or more blocks of block diagrams.

These computer program instructions can also be stored in a computer-readable memory that can guide the computer or other programmable data processing devices to work in a specific manner, such that the instructions stored in the computer-readable memory produce an article of manufacture including instruction means which implement the functions specified in one or more flows of the flow diagrams and/or one or more blocks of block diagrams.

These computer program instructions can also be loaded onto the computer or other programmable data processing devices, such that a series of operational steps are performed on the computer or other programmable devices to produce a computer-implemented process, and therefore the instructions executed on the computer or other programmable devices provide steps for implementing the functions specified in one or more flows of the flow diagrams and/or one or more blocks of block diagrams.

Thus far, the present disclosure has been described in detail. Some details well known in the art have not been described in order to avoid obscuring the concepts of the present disclosure. Those skilled in the art can now fully appreciate how to implement the technical solutions disclosed herein, in view of the foregoing description.

Although some specific embodiments of the present disclosure have been described in detail by way of examples, it should be understood by those skilled in the art that the above examples are for illustration only and are not intended to limit the scope of the present disclosure. It should be appreciated by those skilled in the art that modifications can be made to the above embodiments without departing from the scope and spirit of the present disclosure. The scope of the present disclosure is defined by the attached claims.

What is claimed is:

1. An order reviewing method performed by an order reviewing device, the method comprising:
    determining an order number of an order to which a commodity belongs;
    prompting a location on a rack corresponding to the commodity to an operator according to a correspondence between an order number and a location number of a location, to facilitate the operator to place the commodity on the location;
    in response to the commodity being placed on the location, determining whether the order has been reviewed; and
    if the order has been reviewed, sending a flipping instruction to a flipping system corresponding to the order according to a correspondence between an order and a device number of a flipping system, to instruct a flip assembly of the flipping system to close an inlet of the location for preventing subsequent commodities from being placed on the location, wherein a flip assembly of each flipping system corresponds to one location and is configured to close the inlet of the one location.

2. The order reviewing method according to claim 1, further comprising:
    if the order to which the commodity belongs has been reviewed, sending a state switching instruction to an indicating device corresponding to the order according to a correspondence between an order and a device number of an indicating device.

3. The order reviewing method according to claim 1, further comprising:
    acquiring a location number of a location where the commodity is placed; and
    if the location number of the location where the commodity is placed is consistent with a location number of the prompted location, determining that the commodity is in place.

4. The order reviewing method according to claim 1, further comprising:
    acquiring a device number of a flipping system corresponding to a location where the commodity is placed; and
    if the device number of the flipping system corresponding to the location where the commodity is placed is consistent with a device number of a flipping system corresponding to the prompted location, determining that the commodity is in place.

5. The order reviewing method according to claim 2, further comprising:
    after the indicating device executes the state switching instruction, allowing an operator to pack a commodity of a location corresponding to the order in response to the operator clicking a state switching button of the indicating device.

6. The order reviewing method according to claim 5, wherein: the state switching button comprises a first button and a second button; and
    the first button and the second button are respectively in information binding with operators.

7. The order reviewing method according to claim 5, further comprising:
    determining whether all orders in a review task list have been reviewed, wherein the review task list corresponds to at least one order;
    if all orders in the review task list have been reviewed, determining whether state switching buttons of an indicating device corresponding to all orders have all been clicked;
    if the state switching buttons of the indicating device corresponding to all orders are not all clicked, prompting an operator to click a non-clicked state switching button; and
    if the state switching buttons of the indicating device corresponding to all orders are all clicked, issuing a review task list again.

8. The order reviewing method according to claim 2, wherein the indicating device is an electronic tag.

9. The order reviewing method according to claim 8, wherein the electronic tag is provided on a side of the location, which is opposite to the flipping system.

10. The order reviewing method according to claim 1, further comprising determining that the order has been reviewed if all commodities in the order have been placed on a correct location, wherein:
    the order reviewing method is used for operation in warehouse; and the flipping system is set at an inset of the location of the rack.

11. An order reviewing device, comprising:
a memory; and
a processor coupled to the memory, the processor being configured to perform, based on instructions stored in the memory, an order reviewing method comprising:
determining an order number of an order to which a commodity belongs;
prompting a location on a rack corresponding to the commodity to an operator according to a correspondence between an order number and a location number of a location, to facilitate the operator to place the commodity on the location;
in response to the commodity being placed on the location, determining whether the order has been reviewed; and
if the order has been reviewed, sending a flipping instruction to a flipping system corresponding to the order according to a correspondence between an order and a device number of a flipping system, to instruct a flip assembly of the flipping system to close an inlet of the location for preventing subsequent commodities from being placed on the location, wherein a flip assembly of each flipping system corresponds to one location and is configured to close the an-inlet of the one location.

12. The order reviewing device according to claim 11, wherein:
the order reviewing device is used for operation in warehouse;
the processor is further configured to determine that the order has been reviewed, if all commodities in the order have been placed on a correct location; and
the flipping system is set at an inset of the location of the rack.

13. An order reviewing system, comprising:
the order reviewing device according to claim 11; and
a rack comprising:
at least one rack layer, each rack layer being provided with a partitioning structure configured to partition the rack layer into at least two locations; and
a flipping system corresponding to each location, comprising a flip assembly configured to close an inlet of the location according to a flipping instruction sent from an order reviewing system after it is determined that an order to which a commodity belongs has been reviewed.

14. A non-transitory computer-readable storage medium having stored thereon computer program instructions which, when executed by a processor, implement an order reviewing method comprising:

determining an order number of an order to which a commodity belongs;
prompting a location on a rack corresponding to the commodity to an operator according to a correspondence between an order number and a location number of a location, to facilitate the operator to place the commodity on the location;
in response to the commodity being placed on the location, determining whether the order has been reviewed; and
if the order has been reviewed, sending a flipping instruction to a flipping system corresponding to the order according to a correspondence between an order and a device number of the flipping system, to instruct a flip assembly of the flipping system to close an inlet of the location for preventing subsequent commodities from being placed on the location, wherein a flip assembly of the flipping system corresponds to one location and is configured to close the inlet of the one location.

15. The order reviewing system according to claim 13, wherein a vertical height of the inlet of each location is greater than a vertical height of an outlet.

16. The order reviewing system according to claim 13, wherein the partitioning structure is slidably provided on the rack layer.

17. The order reviewing system according to claim 13, wherein
the partitioning structure is slidably provided on the rack layer.

18. The order reviewing system according to claim 13, wherein the flipping system further comprises a driving motor configured to drive the flip assembly to close the inlet of the location.

19. The order reviewing system according to claim 13, the rack further comprising:
an indicating device corresponding to each location, configured to perform state switching according to a state switching instruction sent from the order reviewing device after it is determined that the order to which the commodity belongs has been reviewed.

20. The non-transitory computer-readable storage medium according to claim 14, wherein:
the non-transitory computer-readable storage medium is used for operation in warehouse;
the order reviewing method further comprises determining that the order has been reviewed if all commodities in the order have been placed on a correct location; and
the flipping system is set at an inset of the location of the rack.

* * * * *